United States Patent
Kawamura et al.

(10) Patent No.: US 8,043,010 B2
(45) Date of Patent: Oct. 25, 2011

(54) WHEEL BEARING APPARATUS INCORPORATED WITH A WHEEL SPEED DETECTING APPARATUS

(75) Inventors: Hiroshi Kawamura, Iwata (JP); Kazunari Yamamoto, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/508,630

(22) Filed: Jul. 24, 2009

(65) Prior Publication Data

US 2009/0285515 A1 Nov. 19, 2009

Related U.S. Application Data (63) Continuation of application No. PCT/JP2008/000082, filed on Jan. 24, 2008.

(30) Foreign Application Priority Data

Jan. 25, 2007 (JP) ................................. 2007-014577

(51) Int. Cl.
*F16C 32/00* (2006.01)
(52) U.S. Cl. ........................................ 384/448
(58) Field of Classification Search .................. 384/448, 384/544, 586; 324/173, 174, 207.22, 207.25
See application file for complete search history.

(56) References Cited

U.S. PATENT DOCUMENTS

| 3,238,812 | A | * | 3/1966 | Hedstrom | 74/607 |
|---|---|---|---|---|---|
| 5,011,303 | A | * | 4/1991 | Caron | 384/448 |
| 5,143,458 | A | * | 9/1992 | Alff et al. | 384/448 |
| 5,564,839 | A | * | 10/1996 | Ouchi et al. | 384/448 |
| 5,622,437 | A | * | 4/1997 | Alff | 384/448 |
| 5,663,640 | A | * | 9/1997 | Sakamoto | 324/173 |
| 5,678,933 | A | * | 10/1997 | Ouchi et al. | 384/448 |
| 6,127,819 | A | * | 10/2000 | Ouchi | 324/173 |
| 6,855,214 | B2 | * | 2/2005 | Obara et al. | 148/325 |
| 7,731,427 | B2 | * | 6/2010 | Torii | 384/544 |
| 2006/0239600 | A1 | * | 10/2006 | Shigeoka et al. | 384/544 |

FOREIGN PATENT DOCUMENTS

| EP | 1 679 518 | 7/2006 |
|---|---|---|
| JP | 2005-054910 | 3/2005 |
| JP | 2005-140320 | 6/2005 |
| JP | 2005-321375 | 11/2005 |

(Continued)

*Primary Examiner* — James Pilkington
(74) *Attorney, Agent, or Firm* — Harness, Dickey & Pierce, P.L.C.

(57) ABSTRACT

A wheel bearing apparatus incorporating a wheel speed detecting apparatus has an outer member and an inner member with a wheel hub and at least one inner ring. Double row rolling elements are contained between the inner and outer raceway surfaces of the inner and outer members. A sensor holder, with a wheel speed sensor to detect the wheel speed, is mounted on the end of the outer member. An encoder is mounted on the inner ring and arranged opposite to the wheel speed sensor, via a predetermined air gap. The sensor holder has an annular ring shaped cover and a holding portion of synthetic resin. The wheel speed sensor is embedded in the holding portion. The cover is press-formed of an anti-corrosion steel sheet. The cover has a cylindrical fitting portion fit onto the end of the outer member. A flange portion extends from the fitting portion and is in close contact with the end face of the outer member. A bottom portion further extends radially inward from the flange portion. At least the outer circumference of the end of the outer member onto, where the cover is fit, is anti-corrosion treated.

10 Claims, 5 Drawing Sheets

FOREIGN PATENT DOCUMENTS

| | | |
|---|---|---|
| JP | 2006-161990 | 6/2006 |
| JP | 2006224692 * | 8/2006 |
| JP | 2006-312371 | 11/2006 |
| WO | WO2005/036183 | 4/2005 |

* cited by examiner

PRIOR ART

WHEEL BEARING APPARATUS INCORPORATED WITH A WHEEL SPEED DETECTING APPARATUS

CROSS-REFERENCE TO RELATED APPLICATIONS

This application is a continuation of International Application No. PCT/JP2008/000082, filed Jan. 24, 2008, which claims priority to Japanese Application No. 2007-014577, filed Jan. 25, 2007. The disclosures of the above applications are incorporated herein by reference.

FIELD

The present disclosure relates to a wheel bearing apparatus, incorporating a wheel speed detecting apparatus, to rotationally support a wheel of a vehicle and detect the wheel speed.

BACKGROUND

Wheel bearing apparatus is generally known that can support a wheel of a vehicle relative to a suspension apparatus. Also, it incorporates a wheel speed detecting apparatus to detect a rotation speed of a wheel of the vehicle to control an anti-lock braking system (ABS). Such a bearing apparatus generally includes a wheel speed detecting apparatus with a magnetic encoder. The encoder has alternately magnetic poles arranged along its circumference. It is integrated into a sealing apparatus arranged between inner and outer members to contain the rolling elements (balls) between the members. It also includes a wheel speed detecting sensor to detect the variation in the magnetic poles of the magnetic encoder according to the rotation of the wheel.

The wheel speed sensor is usually mounted on a knuckle after the wheel bearing apparatus is mounted on the knuckle, which forms a portion of a suspension apparatus. Wheel bearing apparatus incorporating a wheel speed detecting apparatus has been proposed. Here, a wheel speed detecting sensor is incorporated in the wheel bearing in order to reduce the size of the wheel bearing apparatus as well as to eliminate the troublesome air gap adjustment between the wheel speed sensor and the magnetic encoder.

Figure 6:
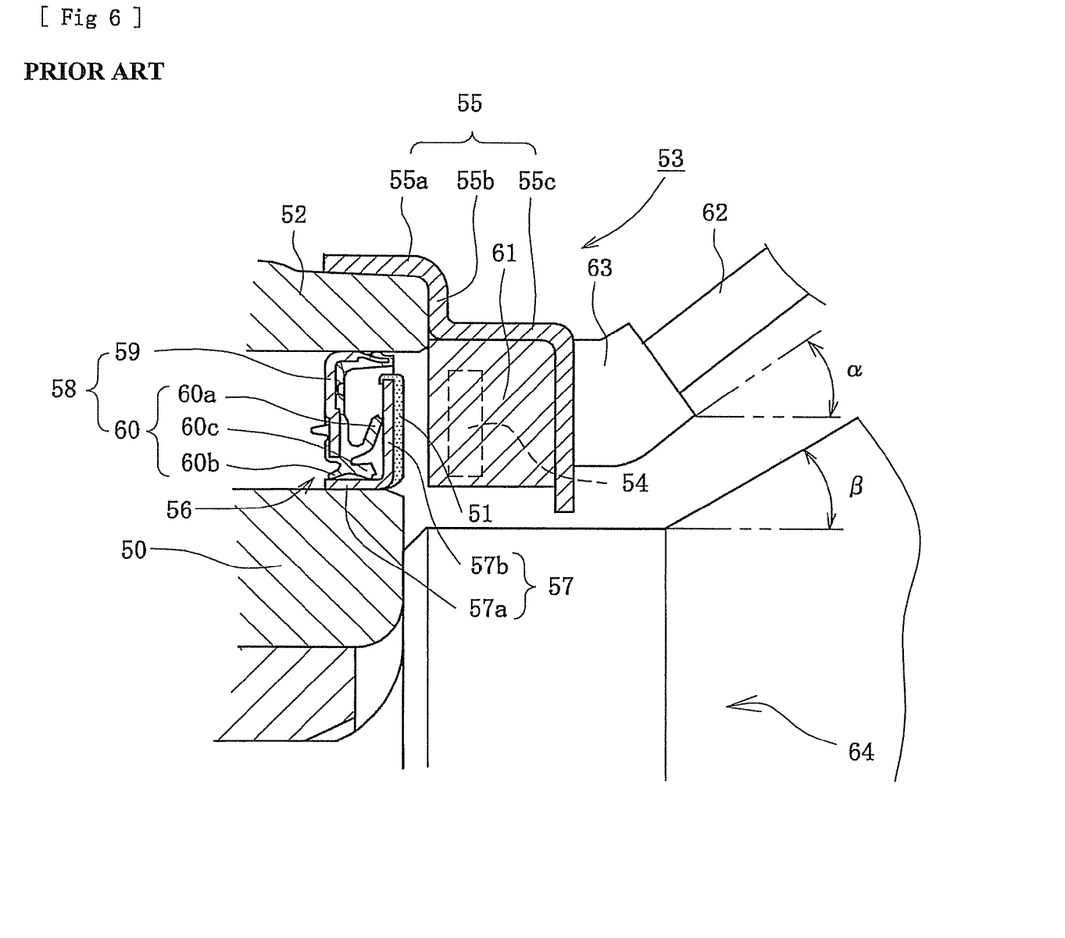
FIG. 6 is a partially enlarged view of a prior art wheel bearing apparatus incorporating a wheel speed detecting apparatus.

A wheel bearing apparatus incorporating a wheel speed detecting apparatus is shown in FIG. 6. The wheel speed detecting apparatus includes a magnetic encoder 51 fit onto an inner ring 50. An annular sensor holder 53 is mounted on the end of an outer member 52 opposite to the magnetic encoder 51. A wheel speed sensor 54 is mounted on the sensor holder 53 and arranged opposite to the magnetic encoder 51, via a predetermined air gap. The encoder 51 is adhered on one side of a slinger 57 forming a seal 56.

The seal 56 includes a slinger 57, formed with an L-shaped cross-section, and an annular sealing plate 58. The sealing plate 58 is also formed with an L-shaped cross-section. The plate 58 is mounted on the outer member 52 opposite to the slinger 57. The slinger 57 has a cylindrical portion 57a fit onto the inner ring 50. A standing portion 57b radially extends outwardly from the cylindrical portion 57a. On the other hand, the sealing plate 58 includes a metal core 59 fit into the end of the outer member 52. A sealing member 60 is integrally bonded to the metal core 59, via vulcanized adhesion. The sealing member 60 is formed of an elastomer, such as rubber, and includes a side lip 60a in sliding-contact with the standing portion 57b of the slinger 57. A grease lip 60b and a middle lip 60c are both in sliding-contact with the cylindrical portion 57a of the slinger 57.

The sensor holder 53 includes a cover 55 formed of a steel plate. The cover 55 is adapted to fit onto an outer member 52. A holding portion 61 is formed of synthetic resin and is joined to the bottom portion 55c of the cover 55. The wheel speed sensor 54 is embedded in the holding portion 61. The cover 55 includes a cylindrical fitting portion 55a, a flange portion 55b, and the bottom portion 55c. The flange portion 55b extends radially inward from the fitting portion 55a. The bottom portion 55c axially extends from the flange portion 55b.

The output of the wheel speed sensor 54 is sent to a controller (not shown) of the ABS, via a harness 62. The harness 62 is connected to a take-out port 63 mounted on the holding portion 61. The take-out port 63 is formed at an inclined angle α set larger than an inclined angle β of the outer circumference of an outer joint member 64.

Accordingly, it is possible to prevent hanging down of the harness 62 and thus interference of the harness 62 with the outer joint member 64. Thus, it is possible to reduce the number of clips to a minimum to secure the harness 62. In addition, it is unnecessary to excessively bend the harness 62 itself. Thus, it is possible to further improve the reliability of the harness 62 while preventing the generation of bad influences on the electric wires within the harness 62. Accordingly, it is possible to simplify the securing operation of the harness 62 and thus to reduce the manufacturing cost of the apparatus. (Reference Patent Document 1: Japanese Laid-open Patent Publication No. 145418/2006)

However, problems exist with the prior art wheel bearing apparatus incorporating a wheel speed detecting apparatus. The accuracy of detection is detracted if muddy water, including salt or magnetic powder, enters into the detecting portion between the encoder 51 and the wheel speed sensor 54.

In addition if the cover 55 becomes corroded by salty water, the securing force of the cover 55 relative to the outer member 52 is diminished. Thus, the cover 55 is enabled to move axially. This not only causes reduction of the detecting accuracy but fixing of the cover 55 and the outer member 52 caused by rust propagation between the two. Thus, a servicing operation to replace the parts forming the bearing apparatus would be difficult.

SUMMARY

It is, therefore, an object of the present disclosure to provide a wheel bearing apparatus incorporating a wheel speed detecting apparatus that has a high sealing ability. Thus, it can prevent the entry of foreign matter, such as salty water or magnetic powder, and also the generation of rust on the cover to improve the reliability of the apparatus for a long term.

To achieve the objects mentioned above, a wheel bearing apparatus incorporating a wheel speed detecting apparatus is provided that comprises an outer member integrally formed, on its outer circumference, with a body mounting flange to be mounted on a knuckle of a vehicle. The outer member inner circumference includes double row outer raceway surfaces. An inner member includes a wheel hub and at least one inner ring. The wheel hub is integrally formed at one end with a wheel mounting flange. A cylindrical portion axially extends from the wheel mounting flange. The inner ring is press fit onto the cylindrical portion of the wheel hub. The wheel hub and the inner ring are formed on their outer circumferences, with double row inner raceway surfaces that oppose the double row outer raceway surfaces. Double row rolling elements are contained between the inner and outer raceway surfaces of the inner and outer members. A sensor holder, with a wheel speed sensor to detect the wheel speed, is adapted to be mounted on the end of the outer member. An encoder is mounted on the inner ring and arranged opposite to the wheel speed sensor, via a predetermined air gap. The sensor holder includes an annular ring shaped cover and a holding portion of synthetic resin. The wheel speed sensor is embedded in the synthetic resin. The cover is press-formed of an anti-corrosion steel sheet. The cover includes a cylindrical fitting portion adapted to be fit onto the end of the outer member. A flange portion extends from the fitting portion and is adapted to be closely contacted with the end face of the outer member. A bottom portion further extends radially inward from the flange portion. At least the outer circumference of the end of the outer member onto which the cover is fit is anti-corrosion treated.

The wheel bearing apparatus incorporating a wheel speed detecting apparatus has a sensor holder with a cover formed from a steel plate having anti-corrosion characteristics. A holding portion of synthetic resin receives and embeds the wheel speed sensor. A harness is connected to the speed sensor to take out the output of the wheel speed detecting sensor. The cover is press-formed of an anti-corrosion steel sheet. The covers include a cylindrical fitting portion adapted to be fit onto the end of the outer member. A flange portion extends from the fitting portion and is adapted to be in close contact with the end face of the outer member. A bottom portion further extends radially inward from the flange portion. At least the outer circumference of the end of the outer member onto which the cover is fit is anti-corrosion treated. Thus, it is possible to provide a wheel bearing apparatus incorporating a wheel speed detecting apparatus that can prevent the generation of rust on the cover and the outer member. Thus, it improves the reliability of the apparatus for a long term.

The cover is formed from a non-magnetic austenitic stainless steel sheet. This assures the exact detection of wheel speed without any bad influence or interference on the detecting performance of the wheel speed sensor.

The outer member is formed of martensitic stainless steel. This makes it possible to improve the anti-corrosion performance of the outer member as well as its surface hardness. Thus, this extends the life of the wheel bearing apparatus.

The inner diameter of the bottom portion of the cover is smaller than the outer diameter of the inner ring. A labyrinth seal has a predetermined gap between the end of the bottom portion and the end face of the inner ring as well as between the outer circumference of the outer joint member forming part of a constant velocity universal joint. This makes it possible to avoid interference between the inner ring and the outer joint member and prevent entry of foreign matter while keeping the sealability of the detecting portion.

A drain is formed on the bottom portion of the cover. The drain makes it possible to discharge foreign matter, such as rain water if it would enter into the cover.

The wheel bearing apparatus incorporating a wheel speed detecting apparatus includes an outer member integrally formed, on its outer circumference, with a body mounting flange to be mounted on a knuckle of a vehicle. The outer member inner circumference includes double row outer raceway surfaces. An inner member includes a wheel hub and at least one inner ring. The wheel hub is integrally formed at one end with a wheel mounting flange. A cylindrical portion axially extends from the wheel mounting flange. The inner ring is press fit onto the cylindrical portion of the wheel hub. The wheel hub and the inner ring are formed, on their outer circumferences, with double row inner raceway surfaces opposite to the double row outer raceway surfaces. Double row rolling elements are contained between the inner and outer raceway surfaces of the inner and outer members. A sensor holder, with a wheel speed sensor to detect the wheel speed, is adapted to be mounted on the end of the outer member. An encoder is mounted on the inner ring and arranged opposite to the wheel speed sensor, via a predetermined air gap. The sensor holder includes an annular ring shaped cover and a holding portion of synthetic resin. The wheel speed sensor is embedded in the synthetic resin. The cover is press-formed of an anti-corrosion steel sheet. The cover includes a cylindrical fitting portion adapted to be fit onto the end of the outer member. A flange portion extends from the fitting portion and is adapted to be closely contacted with the end face of the outer member. A bottom portion further extends radially inward from the flange portion. At least the outer circumference of the end of the outer member, where the cover is fit, is anti-corrosion treated. Thus, it is possible to provide a wheel bearing apparatus incorporating a wheel speed detecting apparatus that can prevent the generation of rust on the cover and the outer member. Thus, this improves the reliability of the apparatus for a long term.

A wheel bearing apparatus incorporating a wheel speed detecting apparatus comprises an outer member integrally formed, on its outer circumference, with a body mounting flange to be mounted on a knuckle of a vehicle. The outer member's inner circumference includes double row outer raceway surfaces. An inner member includes a wheel hub and at least one inner ring. The wheel hub is integrally formed at one end with a wheel mounting flange. A cylindrical portion axially extends from the wheel mounting flange. The inner ring is press fit onto the cylindrical portion of the wheel hub. The wheel hub and the inner ring are formed, on their outer circumferences, with double row inner raceway surfaces opposite to the double row outer raceway surfaces. Double row rolling elements are contained between the inner and outer raceway surfaces of the inner and outer members. A sensor holder, with a wheel speed sensor to detect the wheel speed, is adapted to be mounted on the end of the outer member. An encoder is mounted on the inner ring and is arranged opposite to the wheel speed sensor, via a predetermined air gap. The sensor holder includes an annular ring shaped cover and a holding portion of synthetic resin. The wheel speed sensor is embedded in the holding portion. The cover is press-formed of a non-magnetic austenitic stainless steel sheet. The cover includes a cylindrical fitting portion adapted to be fit onto the end of the outer member. A flange portion extends from the fitting portion and is adapted to be in close contact with the end face of the outer member. A bottom portion further extends radially inward from the flange portion. At least the outer circumference of the end of the outer member on which the cover is fit is anti-corrosion treated.

DRAWINGS

The drawings described herein are for illustrative purposes only of selected embodiments and not all possible implementations, and are not intended to limit the scope of the present disclosure.

DETAILED DESCRIPTION

One preferred embodiments of the present disclosure will be described with reference to the accompanying drawings.

Figure 1:
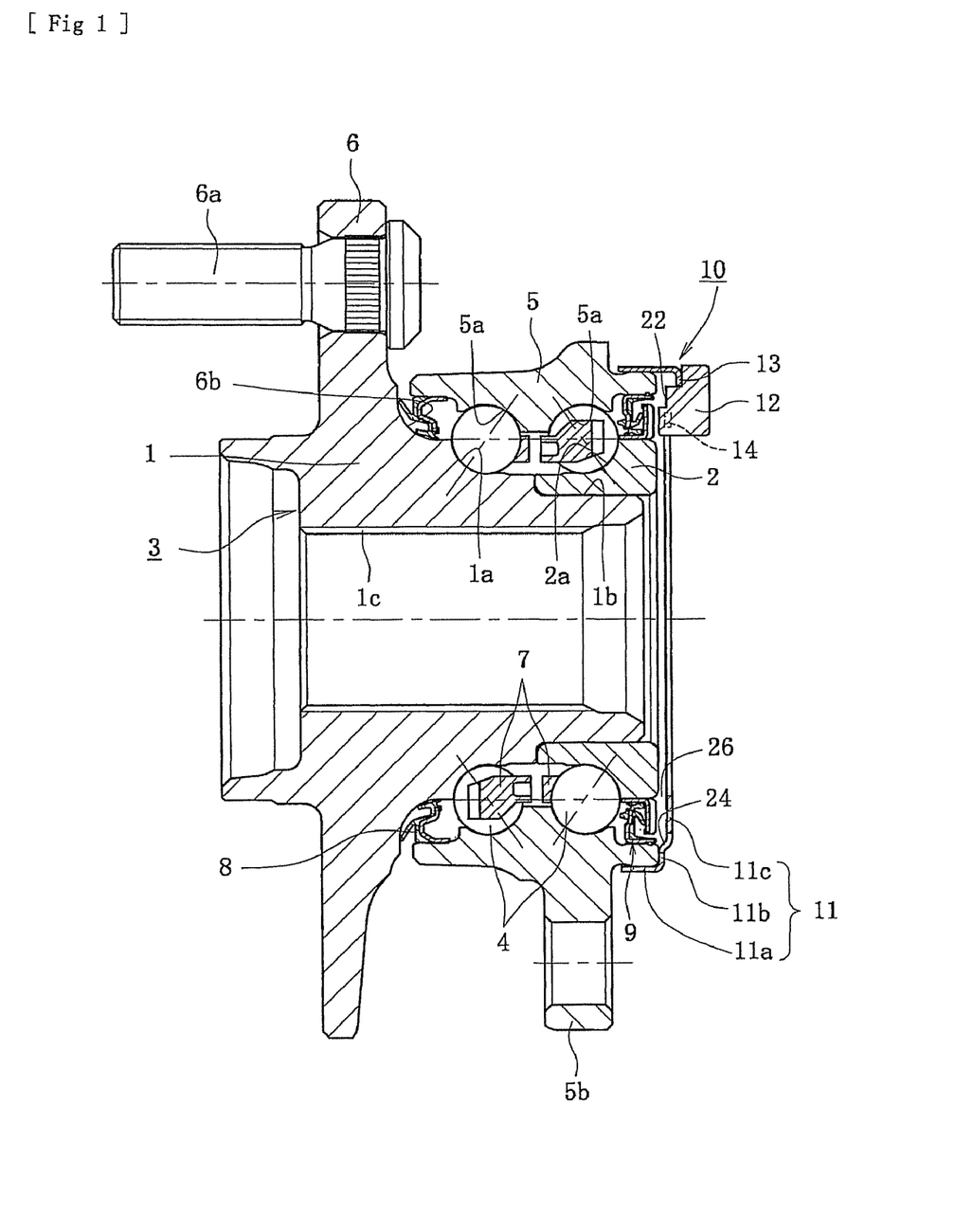
FIG. 1 is a longitudinal-section view of one preferred embodiment of a wheel bearing apparatus incorporating a wheel speed detecting apparatus.
Figure 2:
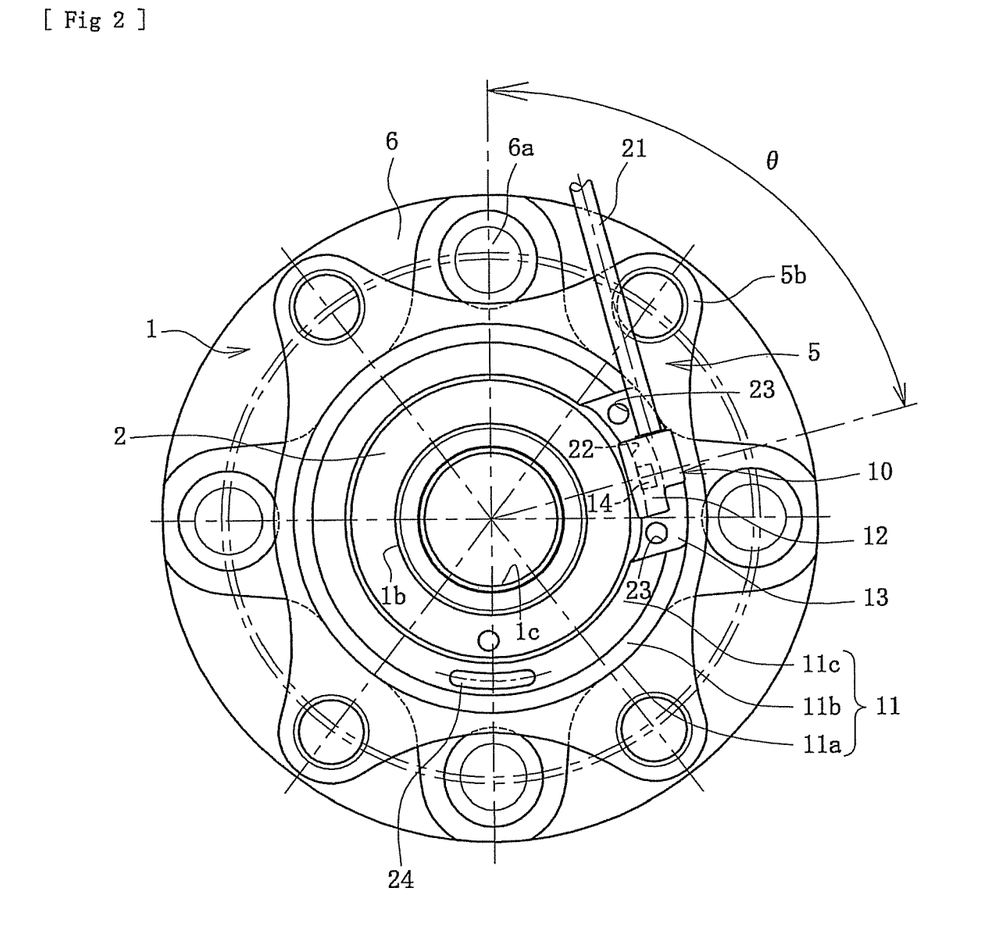
FIG. 2 is a side elevation view of FIG. 1.
Figure 3:
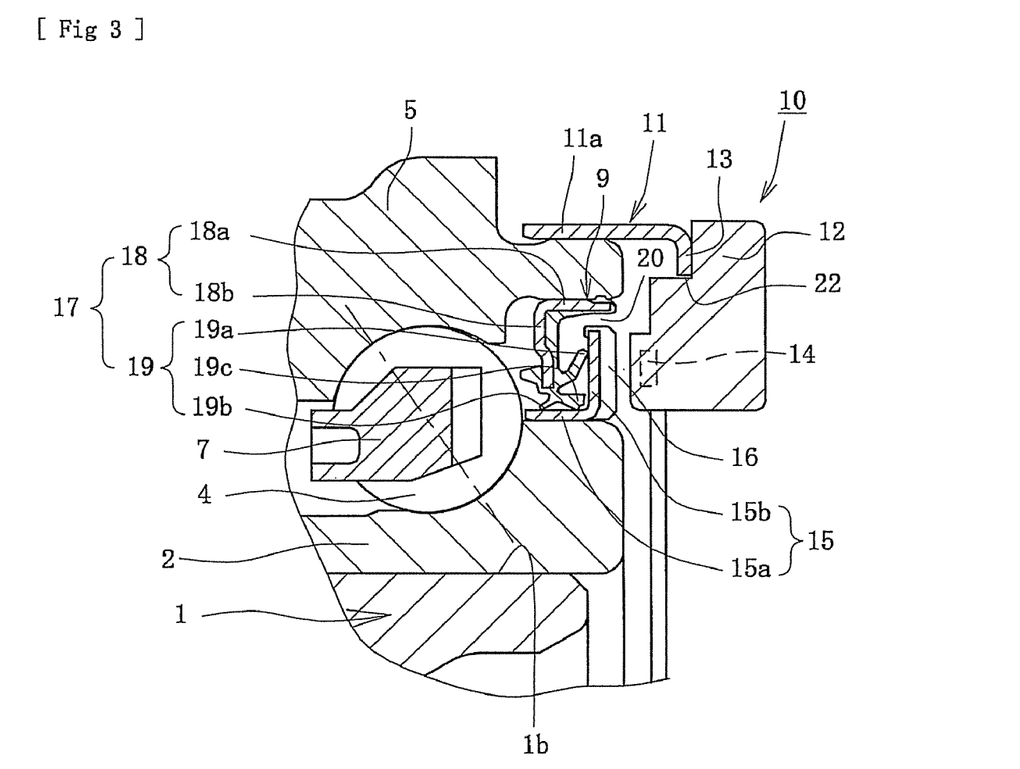
FIG. 3 is a partially enlarged view of a detecting portion of FIG. 1.
Figure 4:
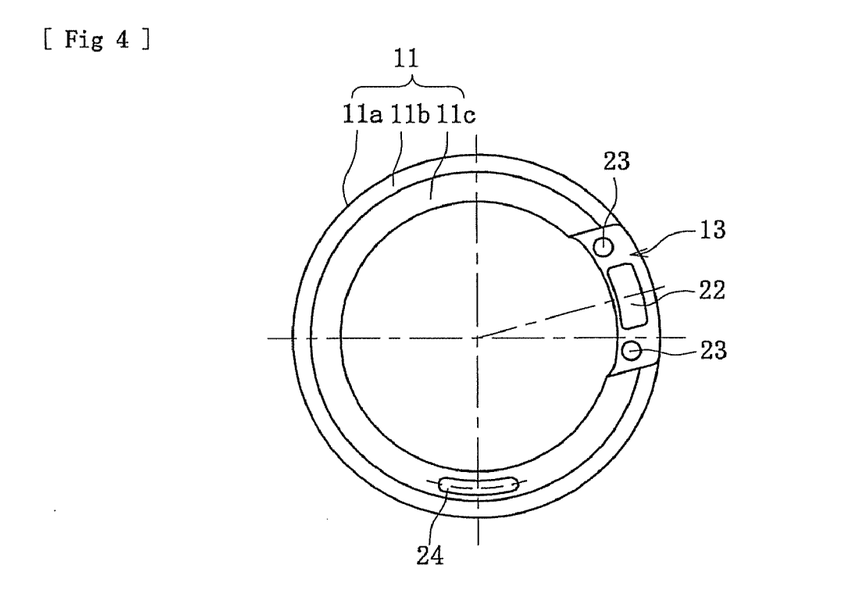
FIG. 4 is a front elevation view of a cover.
Figure 5:
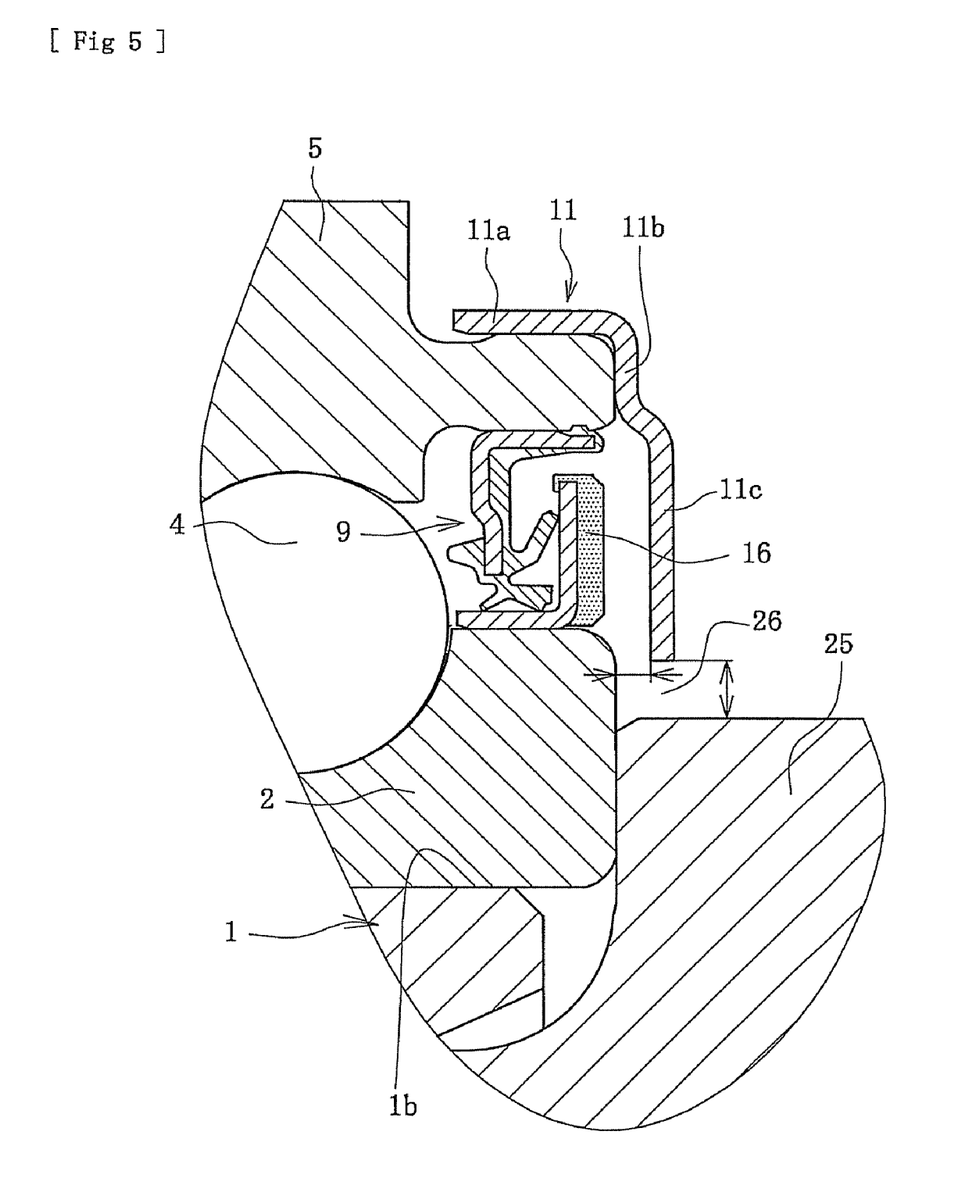
FIG. 5 is a partially enlarged view of FIG. 1.

FIG. 1 is a longitudinal-section view of one preferred embodiment of a wheel bearing apparatus incorporating a wheel speed detecting apparatus. FIG. 2 is a side elevation view of FIG. 1. FIG. 3 is a partially enlarged view of a detecting portion of FIG. 1. FIG. 4 is a front elevation view of a cover. FIG. 5 is a partially enlarged view of FIG. 1. In the description below, an outer side of a bearing apparatus, when it is mounted on a vehicle, is referred to as the "outer side" (the left side in a drawing). The inner side of a bearing apparatus, when it is mounted on a vehicle, is referred to as the "inner side" (the right side in a drawing).

The wheel bearing apparatus incorporating a wheel speed detecting apparatus is a so-called "third generation" type for a driving wheel. It includes an inner member 3 with a wheel hub 1 and an inner ring 2. An outer member 5 is arranged around the inner member 3 via double row rolling elements (balls) 4, 4.

The wheel hub 1 is integrally formed, on its outer side end, with a wheel mount flange 6 to mount a wheel (not shown). Hub bolts 6a are arranged on the wheel mounting flange 6 along its circumference at equidistant positions. In addition, the wheel hub 1 is formed, on its outer circumference, with one (outer side) inner raceway surface 1a. The wheel hub inner circumference includes a serration (or spline) 1c for torque transmission. The wheel hub 1 has a cylindrical portion 1b that axially extends from the inner raceway surface 1a. An inner ring 2 is press fit onto the cylindrical portion 1b of the wheel hub 1, via a predetermined interference. The inner ring 2 is formed, on its outer circumference, with the other (inner side) inner raceway surface 2a.

The outer member 5 is made of medium carbon steel such as S53C including carbon of 0.40~0.80% by weight. It is integrally formed on its outer circumference with a body mount flange 5b. The flange 5b is adapted to be mounted on a knuckle (not shown). The outer member inner circumference is formed with double row outer raceway surfaces 5a, 5a arranged opposite to the double row inner raceway surfaces 1a, 2a. These double row outer raceway surfaces 5a, 5a are hardened by high frequency induction quenching to have a surface hardness of 58~64 HRC. Double row rolling elements 4, 4 are contained between the outer raceway surfaces 5a, 5a of the outer member 5 and the oppositely arranged inner raceway surfaces 1a, 2a. The rolling elements are held by cages 7, 7. Seals 8, 9 are mounted in an annular openings formed between the outer member 5 and the inner member 3. The seals prevent the leakage of grease contained within the bearing apparatus as well as the entry of rain water or dusts into the bearing.

The wheel hub 1 is made of medium carbon steel such as S53C including carbon of 0.40-0.80% by weight. It is hardened by high frequency induction hardening to have a surface hardness of 58-64 HRC in a region from a seal land 6b, which the outer side seal 8 slidingly-contacts, to the cylindrical portion 1b, via the inner raceway surface 1a. This makes it possible to improve the anti-abrasion characteristics of the seal land portion 6b forming the base of the wheel mounting flange 6. Also, it makes it possible to suppress fretting of the cylindrical portion 1b forming a fitting surface against the inner ring 2. Also, it applies a sufficient mechanical strength of the wheel mounting flange 6 against the rotary bending load and thus improves the durability of the wheel hub 1.

In this embodiment, a sensor holder 10 is mounted on the end of the outer member 5. The sensor holder 10 comprises a cup-shaped cover 11 and a holding portion 12 connected to the cover 11. The cover 11 is formed with a generally annular configuration. The cover 11 includes a cylindrical fitting portion 11a that is adapted to be fit onto the end of the outer member 5. The end of the cylindrical fitting portion 11a extends over an annular groove formed in the outer diameter surface of the outer member 5. A flange portion 11b extends from the fitting portion 11a and is adapted to be in close contact with the end face of the outer member 5. A bottom portion 11c further extends radially inward from the flange portion 11b.

The sensor holder 10 can be easily and exactly positioned and secured relative to the outer member 5. This is accomplished by the fitting portion 11a of the cover 11 fit onto the outer member under a condition where the flange portion 11b is in close contact with the end face of the outer member 5. Thus, it is possible to accurately detect the wheel speed. The cover 11 is press-formed of an anti-corrosive non-magnetic steel plate. An example is a stainless steel plate such as an austenitic stainless steel (JIS SUS 304 etc.). This provides a wheel bearing apparatus incorporating a wheel speed detecting apparatus that can prevent the generation of rust on the cover 11 without initiating any bad influence or interference on the detecting performance of the wheel speed sensor 14. Thus, it provides high reliability of the wheel bearing apparatus for a long term.

Other materials than those mentioned above may be used for forming the cover 11. Some materials are various plated steel plates of Cr, Ni, Sn etc., a molten zinc plated steel plate, a alloyed molten zinc plated steel plate with the plated layer formed as an alloy of Zn—Fe after formation of the molten zinc plate, a zinc-aluminum alloy plated steel plate, a so-called chromizing steel plate or a calorizing steel plate where chromium or boron is carburized, or a Zn—Al—Mg plated steel plate (Trade name: "ZAM").

In this embodiment, the outer circumference of the inner side end of the outer member 5, onto which the cover 11 is fit, is anti-corrosion treated. Examples of the anti-corrosion treatment are black oxide finish, phosphate coating treatment, various plating of Cr, Ni, Zn, Sn etc., chromizing treatment or calorizing treatment where chromium or boron is carburized. This prevents rust propagation to the outer member 5 from the cover 11. Thus, this prevents to fix the connection between the cover 11 and the outer member 5 that was caused by rust propagation. Accordingly, a servicing operation of replacing the parts forming the bearing apparatus will become easier. In addition, the outer member 5 itself may be formed of martensitic stainless steel such as SUS440C into which 1.2 wt % of C and 18 wt % of Cr—Mo added. This improves the anti-corrosion performance of the outer member 5 and its surface hardness to extend its service life.

The holding portion 12 where the wheel speed sensor 14 is embedded is mounted on a radially outward portion of the bottom portion 11c of the cover 11. The holding portion 12 is formed of synthetic resin and is mounted on a securing portion 13 described later.

The wheel speed sensor 14 includes a magnetic detecting element such as a Hall element, a magnetic resistance element (MR element) etc. that changes characteristics in accordance with the flowing direction of magnetic flux. Also, an IC incorporated with a waveform shaping circuit to shape the output waveform of the magnetic detecting element may be used.

As shown in FIG. 3, a slinger 15 is press-fit onto the inner ring 2. The slinger 15 axially opposes the holding portion 12. The slinger 15 includes a portion of the inner side seal 9. The slinger 15 has a cylindrical portion 15a press-fit onto the inner ring 2. A standing portion 15b extends radially outward from the cylindrical portion 15a. The slinger 15 is formed of a steel plate such as ferritic stainless steel sheet (JIS SUS 430 etc.) or preserved cold rolled sheet (JIS SPCC etc.) by pressing it to a generally annular configuration having a substantially L-shaped cross-section. A magnetic encoder 16, formed of a rubber magnet of elastomer such as rubber mingled with magnetic powder, is integrally bonded, via vulcanized adhesion, to an inner side surface of the standing portion 15b of the slinger 15. The magnetic encoder 16 provides a rotary encoder to detect the wheel speed with N and S poles alternately arranged along its circumference.

The inner side seal 9 includes the slinger 15 and an annular sealing plate 17. The plate 17 has a substantially L-shaped cross-section and is mounted on the outer member 5 opposite toward the slinger 15. The sealing plate 17 comprises a metal core 18 with a cylindrical portion 18a press-fit into the end of the outer member 5. A standing portion 18b extends radially inward from one end of the cylindrical portion 18a. A sealing member 19 is bonded to the metal core 18 via vulcanized adhesion. The metal core 18 is press-formed from a steel plate such as an austenitic stainless steel sheet (JIS SUS 304 etc.) or a preserved cold rolled sheet (JIS SPCC etc.).

The sealing member 19 is formed of an elastic material such as rubber. The sealing member 19 includes a side lip 19a in sliding-contact with the standing portion 15b of the slinger 15. A grease lip 19b and a middle lip 19c are both in sliding-contact the cylindrical portion 15a of the slinger 15. In addition the outer circumferential edge of the standing portion 15b of the slinger 15 is opposite to the cylindrical portion 18a of the metal core 18 via a slight gap and forms a labyrinth seal 20 between the two.

In the illustrated embodiment, the inner side seal 9 and the sensor holder 10 are axially arranged opposite to each other. The magnetic encoder 16 is integrally bonded to the slinger 15 forming the seal 9. The wheel speed sensor 14 is embedded in the holding portion 12 forming the sensor holder 10. The speed sensor 14 is arranged opposite to the magnetic encoder 16 via an axial gap (air gap). As shown in FIG. 2, the output of the wheel speed sensor 14 is taken out by a harness 21 and sent to a controller of the ABS (not shown). The holding portion 12 is arranged within 30°-90° relative to a line normal to the ground. The harness 21 extends tangentially to the cover 11 from the holding portion 12 and is connected to the wheel speed sensor 14. Accordingly, the harness 21 can be easily led radially outward of the knuckle and improves the workability of the assembly.

In this case, if the inclination angle θ of the holding portion 12 connected to the cover 11 is smaller than 30° relative to the line normal to the ground, the harness 21 must be taken out radially outward from the knuckle under an excessively bent condition. Thus, the bent angle of the harness 21 relative to the holding portion 12 is increased. Here, it is believed that conductive wires within the harness 21 would be damaged. On the contrary, if the inclination angle θ exceeds 90°, an unnecessary long harness 21 is required. Thus, not only is the workability of the assembly detracted from but the harness 21 tends to interfere with the knuckle and other surrounding parts.

As shown in FIG. 4, the holding portion 12 is connected to a securing portion 13 formed on the bottom portion 11c of the cover 11. The securing portion 13 is formed as a box shape axially projected in part from the fitting portion 11a and the bottom portion 11c. A rectangular cut-out portion 22 receives the holding portion 12. Two apertures 23 formed in the securing portion 13 secure the holding portion 12. A portion of the holding portion 12 is inserted into the cut-out portion 22. The holding portion 12 is secured to the cover 11 by engaging the projections formed on the holding portion 12 within the apertures 23 and then by caulking the projections from the outside. Thus, the holding portion 12 can be easily connected to the cover 11 without any rattle. The configuration of the cut-out portion 22 may be an opening formed radially inward rather than the rectangular configuration shown in FIG. 4. The number of the apertures 23 is not limited to two and may be suitably selected to have one or three or more.

A drain 24 having a cocoon shaped (substantially long ellipse) configuration is formed on the downside of the bottom portion 11c. The drain 24 enables discharge of foreign matter, such as rain water, that enters into the cover 11 from the outside. Although the drain 24 is illustrated as having a cocoon configuration, other configurations such as a circular or rectangular configuration may be selected.

As shown in FIG. 5, the inner circumferential edge of the bottom portion 11c is formed with a smaller diameter than an outer circumference of the inner ring 2 except at the securing portion 13 of the cover 11. Accordingly, a labyrinth seal 26 having a predetermined gap is formed between the inner circumferential edge of the bottom portion 11c and the inner ring 2 as well as the outer circumference of the outer joint member 25 that forms the constant velocity universal joint. Accordingly, since the magnetic encoder 16 is prevented from being exposed to the outside by the bottom portion 11c of the cover 11, it is possible to prevent the magnetic encoder 16 from being damaged by foreign matter, such as pebbles, that would enter from the outside. Thus, this keeps high detecting accuracy for a long term. It is preferable to set the gap between the inner circumferential edge of the bottom portion 11c and the inner ring 2 at a range of 0.5-2.0 mm. The gap between the inner circumferential edge of the bottom portion 11c and the outer joint member 25 is set at a range of 0.5-3.0 mm. This avoids interference between them and assures improved sealability.

Although it is shown as an illustrated example, the active type wheel speed sensor includes the magnetic encoder 16 and the rotation speed sensor 14 with a magnetic detecting element such as the Hall element, the present disclosure can be applied to a passive type wheel speed sensor including the magnetic encoder, magnets and wound annular coils.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

The wheel bearing apparatus incorporating a wheel speed detecting apparatus of the present disclosure can be applied to wheel bearing apparatus including any type of wheel speed detecting apparatus.

What is claimed is:
1. A wheel bearing apparatus incorporating a wheel speed detecting apparatus comprising:
an outer member integrally formed, on its outer circumference, with a body mounting flange to be mounted on a knuckle of a vehicle, said outer member having an inner circumference including double row outer raceway surfaces;

an inner member including a wheel hub and at least one inner ring, the wheel hub being integrally formed at one end with a wheel mounting flange, a cylindrical portion axially extending from the wheel mounting flange, the inner ring being press fit onto the cylindrical portion of the wheel hub, the wheel hub having an inner raceway surface formed on its outer circumference and being positioned opposite one of the double row outer raceway surfaces of the outer member and the inner ring having an inner raceway surface formed on its outer circumference and being positioned opposite the other double row outer raceway surfaces of the outer member;

double row rolling elements are contained between the inner raceway surfaces and outer raceway surfaces of the inner member and outer member;

a sensor holder adapted to be mounted on an end member of the outer member, said sensor holding including a wheel speed sensor for detecting the wheel speed;

an encoder mounted on the inner ring and arranged opposite to the wheel speed sensor via a predetermined air gap;

the sensor holder further including an annular ring shaped cover and a holding portion of synthetic resin, the wheel speed sensor is embedded in said holding portion, the cover is press-formed of a anti-corrosion steel sheet and further comprises a cylindrical fitting portion adapted to be fit onto the end member of the outer member for retaining the holding portion on the outer member and an annular groove is formed on an outer diameter surface of the outer member at an end of the cylindrical fitting portion of the cover such that the end of the cylindrical fitting portion of the cover extends over the annular groove formed in the outer diameter surface of the outer member, a flange portion extending from the fitting portion and adapted to be in contact with an end face of the end member of the outer member, and a bottom portion further extending radially inward from the flange portion such that the bottom portion is adjacent an end of the inner ring creating a labyrinth seal, and at least an outer circumference of the end member of the outer member, onto which the cover is fit, is anti-corrosion treated and the holding portion where the wheel speed sensor is embedded is connected to one portion of the bottom portion of the cover; and a wire harness coupled with said wheel speed sensor, said wire harness extends tangentially to the cover from the holding portion.

2. The wheel bearing apparatus incorporating a wheel speed detecting apparatus of claim 1, wherein said cover is formed of a non-magnetic austenitic stainless steel sheet.

3. The wheel bearing apparatus incorporating a wheel speed detecting apparatus of claim 1, wherein said outer member is formed of martensitic stainless steel.

4. The wheel bearing apparatus incorporating a wheel speed detecting apparatus of claim 1, wherein the inner diameter of the bottom portion of the cover is smaller than the outer diameter of the inner ring, and the labyrinth seal having a predetermined gap between the end of the bottom portion and an end face of the inner ring as well as an outer circumference of the outer joint member forming part of a constant velocity universal joint.

5. The wheel bearing apparatus incorporating a wheel speed detecting apparatus of claim 1, wherein a drain is formed on the bottom portion of the cover.

6. A wheel bearing apparatus for a driving wheel incorporating a wheel speed detecting apparatus comprising:

an outer member integrally formed, on its outer circumference, with a body mounting flange to be mounted on a knuckle of a vehicle, said outer member having an inner circumference including double row outer raceway surfaces;

an inner member including a wheel hub and at least one inner ring, the wheel hub being integrally formed at one end with a wheel mounting flange, a cylindrical portion axially extending from the wheel mounting flange, the inner ring being press fit onto the cylindrical portion of the wheel hub, the wheel hub having an inner raceway surface formed on its outer circumference and being positioned opposite one of the double row outer raceway surfaces of the outer member and the inner ring having an inner raceway surface formed on its outer circumference and being positioned opposite the other double row outer raceway surfaces of the outer member;

double row rolling elements are contained between the inner raceway surfaces and outer raceway surfaces of the inner member and outer member;

a sensor holder adapted to be mounted on an end member of the outer member, said sensor holding including a wheel speed sensor for detecting the wheel speed;

an encoder mounted on the inner ring and arranged opposite to the wheel speed sensor via a predetermined air gap;

the sensor holder further including an annular ring shaped cover including an aperture for receiving a constant velocity joint and a holding portion of synthetic resin, the wheel speed sensor is embedded in said holding portion, the cover is press-formed of a anti-corrosion steel sheet and further comprises a cylindrical fitting portion adapted to be fit onto the end member of the outer member for retaining the holding portion on the outer member and an annular groove is formed on an outer diameter surface of the outer member at an end of the cylindrical fitting portion of the cover such that the end of the cylindrical fitting portion of the cover extends over the annular groove formed in the outer diameter surface of the outer member, a flange portion extending from the fitting portion and adapted to be in contact with an end face of the end member of the outer member, and a bottom portion further extending radially inward from the flange portion such that the bottom portion is adjacent an end of the inner ring creating a labyrinth seal, a securing portion axially projects from the fitting portion and the bottom portion, a rectangular cut out portion is formed in the securing portion for receiving the holding portion, a portion of the holding portion is inserted into the cut out portion, and at least an outer circumference of the end member of the outer member, onto which the cover is fit, is anti-corrosion treated and the holding portion where the wheel speed sensor is embedded is connected to one portion of the bottom portion of the cover; and a wire harness coupled with said wheel speed sensor, said wire harness extends tangentially to the cover from the holding portion.

7. The wheel bearing apparatus incorporating a wheel speed detecting apparatus of claim 6, wherein said cover is formed of a non-magnetic austenitic stainless steel sheet.

8. The wheel bearing apparatus incorporating a wheel speed detecting apparatus of claim 6, wherein said outer member is formed of martensitic stainless steel.

9. The wheel bearing apparatus incorporating a wheel speed detecting apparatus of claim 6, wherein the inner diameter of the bottom portion of the cover is smaller than the outer diameter of the inner ring, and the labyrinth seal having a predetermined gap between the end of the bottom portion and an end face of the inner ring as well as an outer circumference of the outer joint member forming part of the constant velocity universal joint.

10. The wheel bearing apparatus incorporating a wheel speed detecting apparatus of claim 6, wherein a drain is formed on the bottom portion of the cover.

* * * * *